US006502531B1

(12) United States Patent
Pound et al.

(10) Patent No.: US 6,502,531 B1
(45) Date of Patent: Jan. 7, 2003

(54) DEVICE AND METHOD FOR EXAMINATION AND HANDLING OF DEER AND OTHER ANIMALS

(75) Inventors: J. Mathews Pound, Ingram, TX (US); Craig A. LeMeilleur, Kerrville, TX (US); Gary R. Earl, Kerrville, TX (US); G. Keith Shelley, Kerrville, TX (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/870,145

(22) Filed: May 30, 2001

(51) Int. Cl.⁷ .......................... A01K 15/04; A61D 3/00
(52) U.S. Cl. ................ 119/752; 119/754; 119/756; 119/757; 119/728
(58) Field of Search .................... 119/712, 751, 119/752, 753, 754, 756, 757, 728, 473; 452/54

(56) References Cited

U.S. PATENT DOCUMENTS

| | | | | |
|---|---|---|---|---|
| 1,234,733 A | * | 7/1917 | Corington | 119/722 |
| 2,660,982 A | * | 12/1953 | Linton | 119/733 |
| 2,672,126 A | * | 3/1954 | Linton | 119/726 |
| 2,733,685 A | * | 2/1956 | Rue | 119/733 |
| 2,909,153 A | * | 10/1959 | McKinley et al. | 119/728 |
| 2,912,715 A | * | 11/1959 | Moss | 119/752 |
| 2,942,575 A | * | 6/1960 | Boyd et al. | 119/728 |
| 3,027,594 A | | 4/1962 | Moss | |
| 3,112,519 A | | 12/1963 | Hlavacek et al. | |
| 3,115,670 A | | 12/1963 | Hlavacek et al. | |
| 3,237,602 A | * | 3/1966 | Rens | 119/728 |
| 3,683,864 A | * | 8/1972 | Priefert | 119/733 |
| 4,169,429 A | * | 10/1979 | Vass | |
| 4,201,158 A | * | 5/1980 | Parker | 119/751 |
| 4,214,555 A | * | 7/1980 | Sawby | 119/723 |
| 4,590,887 A | * | 5/1986 | Holopainen | 119/723 |
| 4,655,173 A | * | 4/1987 | Pope | 119/754 |
| 5,035,204 A | * | 7/1991 | Knoss | 119/752 |
| 5,111,773 A | * | 5/1992 | Akins | 119/523 |
| 5,184,572 A | * | 2/1993 | Meier | 119/733 |
| 5,282,441 A | * | 2/1994 | Ricketts | 119/724 |
| 5,331,923 A | * | 7/1994 | Mollhagen | 119/729 |
| 5,645,016 A | * | 7/1997 | Mahurin | 119/752 |
| 5,738,045 A | * | 4/1998 | Bleacher | 119/751 |
| 5,752,472 A | | 5/1998 | Jubinville et al. | |
| 6,035,808 A | * | 3/2000 | Herman | 119/512 |
| 6,089,192 A | * | 7/2000 | Gent | 119/723 |
| 6,199,514 B1 | * | 3/2001 | Jubinville et al. | 119/728 |

FOREIGN PATENT DOCUMENTS

| | | |
|---|---|---|
| GB | 1261722 | 1/1972 |
| GB | 2209455 | * 5/1989 |

* cited by examiner

Primary Examiner—Yvonne R. Abbott
(74) Attorney, Agent, or Firm—M. Howard Silverstein; Randall E. Deck; John D. Fado

(57) ABSTRACT

An apparatus is provided for restraining wildlife with minimal trauma to the animal. The apparatus includes a housing having open front and rear ends allowing the entry and exit of a target animal, while the rear end includes an openable/closable door effective for controlling the egress of the target animal from the housing. To immobilize the animal, a deer lift is disposed within the interior of the housing having opposed, outwardly and upwardly inclined surfaces which are vertically movable between a first, lower position and a second, raised position. The opposed surfaces are spaced from one another with the space therebetween defining a narrow passageway allowing the target animal to walk between the opposed surfaces in the lower position. However, the width between the opposed surfaces is sufficiently close such that they engage the trunk or body of the animal when raised.

18 Claims, 6 Drawing Sheets

DEVICE AND METHOD FOR EXAMINATION AND HANDLING OF DEER AND OTHER ANIMALS

BACKGROUND OF THE INVENTION

1. Field of the Invention

The invention relates to a device and method for examining and handling deer and other wild or domestic animals.

2. Related Art

Many diseases are transmissible to man and animals by ectoparasites such as ticks. Because some wildlife species, such as white-tailed deer, are capable of propagating and harboring large populations of these ectoparasites, an effective strategy for the prevention of disease transmission should include treatment of animals, including wildlife, for the control of ectoparasites. Yet, the monitoring and treatment of significant numbers of animals, especially wildlife that are not easily captured or otherwise able to be handled and treated directly, for control of these ectoparasites remains a difficult problem.

In areas where an effort is being made to eradicate ticks, the inability to monitor the occurrence ticks on wildlife and apply appropriate control measures can be a critical factor to the success of the program. For example, cattle ticks were eradicated from the United States in the 1940's, and a quarantine zone was established along the Texas-Mexico border between Del Rio and Brownsville, Tex. to prevent reinfestation of U.S. cattle herds. Yearly outbreaks of ticks that occur in the quarantine zone are controlled by dipping of cattle and by vacating infested pastures. However, increased populations of white-tailed deer, elk, exotic deer, antelope and other marginal host animals in the region are complicating the eradication effort, and in some areas have prevented eradication on premises re-infested with the ticks. For other ectoparasites such as blacklegged ticks, the vectors of Lyme disease, wildlife, and white-tailed deer in particular, are the primary hosts for adult ticks. The ability to monitor and control these ticks on deer would therefore be a valuable tool in the management of Lyme disease.

In U.S. Pat. No. 5,367,983, we disclosed a device and method for feeding and applying pesticides onto animals, including deer. That device incorporates vertical support members carrying pesticide applicators which the animal contacts in the course of feeding, thereby applying the pesticide to the neck and head of the animal. More recently, in U.S. Pat. No. 5,881,672, we disclosed a device for applying collars on deer and other animals. Application of pesticide impregnated collars with this device has allowed prolonged control of ticks and other parasites on these animals.

Although these developments have shown promise in ectoparasite control, the need remains for an improved apparatus and method which will allow examination and treatment of deer and other wildlife. Jubinville (U.S. Pat. No. 5,752,472) disclosed an apparatus for restraining deer and other antlered animals having a V shaped chute with opposed sidewalls and a drop-down floor. Once the animal enters the chute, the floor is dropped, suspending the deer with its body held against the sloping opposed sidewalls. With the deer so restrained, it may be examined or handled without injury to either the handler or the animal. However, despite these improvements, the animal may be subjected to stress or trauma as the floor is released. Consequently, there remains a need for an improved device and method for restraining and handling deer and other animals with less trauma.

SUMMARY OF THE INVENTION

We have now developed an apparatus and method for restraining wildlife so that they may be safely examined and/or handled with minimal trauma to the animal. The apparatus includes a housing having open front and rear ends allowing the entry and exit of a target animal, while the rear end includes a first openable/closable door effective for controlling the egress of the target animal from the interior of the housing. To immobilize the animal, a deer lift is disposed within the interior of the housing having opposed, outwardly and upwardly inclined surfaces which are vertically movable between a first, lower position and a second, raised position. The opposed surfaces are spaced from one another with the space therebetween defining a narrow passageway having a width which is effective to allow the target animal to walk between the opposed surfaces when they are in the lower position. However, the width between the opposed surfaces is sufficiently close such that the opposed sides engage the trunk or body of the animal when they are raised. The apparatus further includes a means for raising the opposed surfaces between the lower and raised positions. In operation, when a target animal has entered the housing through the open end and moved between the opposed surfaces, it is lifted off the ground or floor by raising the opposed surfaces to a height effective to engage the trunk of the animal and suspend its legs off the floor or ground. The animal is thereby immobilized, allowing ready examination and/or handling thereof. Upon completion, the animal is allowed to egress from the rear end of the housing by lowering of the opposed surfaces and opening the openable/closable door.

In accordance with this discovery, it is an object of this invention to provide an apparatus and method for restraining animals, particularly deer and other wildlife.

Another object of this invention is to provide a method and apparatus for humanely restraining an animal so that it may be examined or handled without injury to either the handler or the animal, also while minimizing the stress and trauma to the animal.

Yet another object of this invention is to provide a method and apparatus for humanely restraining an animal while minimizing trap shyness by the animals, thereby allowing the animals to be subsequently captured and restrained multiple times.

These and other objects and advantages of the invention will become readily apparent from the ensuing description.

DETAILED DESCRIPTION OF THE INVENTION

Figure 1:
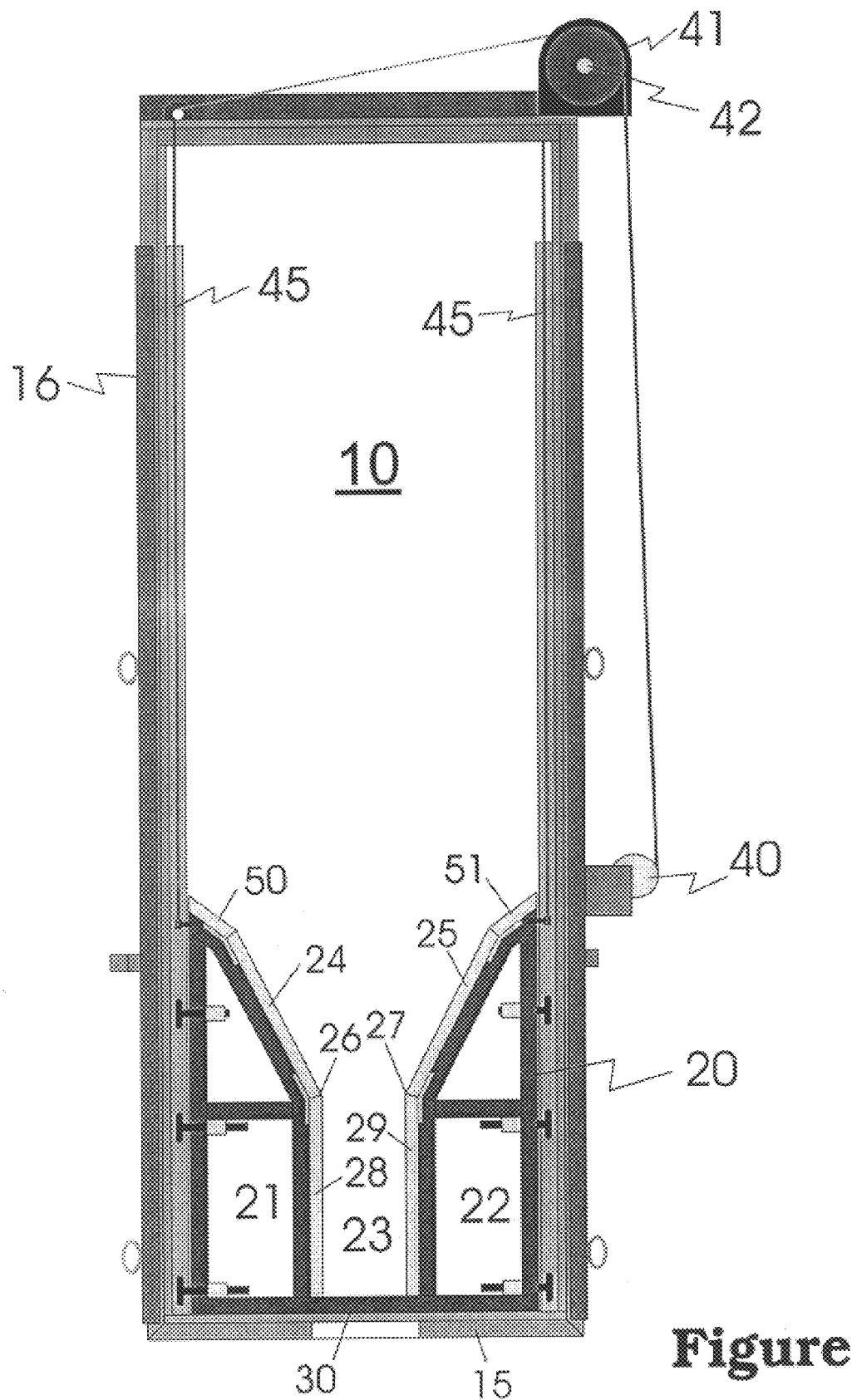
FIG. 1 is a cross-sectional end view of the apparatus with the opposed surfaces in a first, lower position.

The apparatus of the invention is effective for gently and humanely restraining animals so that they may be safely examined and/or handled while subjecting the animal to a minimal level of trauma. Although the invention may be used with a number of animals, including domestic animals, it is particularly valuable for the examination and treatment of wild or captive animals. Without being limited thereto, animals which may be restrained and immobilized include deer, such as white-tailed deer, axis deer, and red deer, antelope such as blackbuck antelope, and elk, as well as sheep, goats, swine and cattle.

Referring to the Figures, the apparatus includes a housing 10 in which the animal is to be restrained, having open front and rear ends 11 and 12, respectively, through which the animal may enter and exit. The rear end 12 is provided with an openable/closable door 13 to prevent the animal's escape before examination or treatment are completed. Front end 11 is also preferably provided with an openable/closable door 14 to control access to the housing. The size of the housing as well as doors 13 and 14 may vary with the particular target animal, but should be sufficient to allow unimpeded passage of the target animal into and through the housing. The housing may rest on the ground without a floor, although an optional floor 15 for supporting the animal as it walks through the housing is preferably provided. The sides of the housing may be open, but are preferably closed by providing at least one, and most preferably two, openable/closable access doors 16 and 17 of sufficient size to allow the handler to examine and treat the full length of the animal. Doors 13, 14, 16, and 17 may be sliding or hinged. Alternatively, a heavyweight curtain may be used to cover the open sides in lieu of doors.

Figure 4:
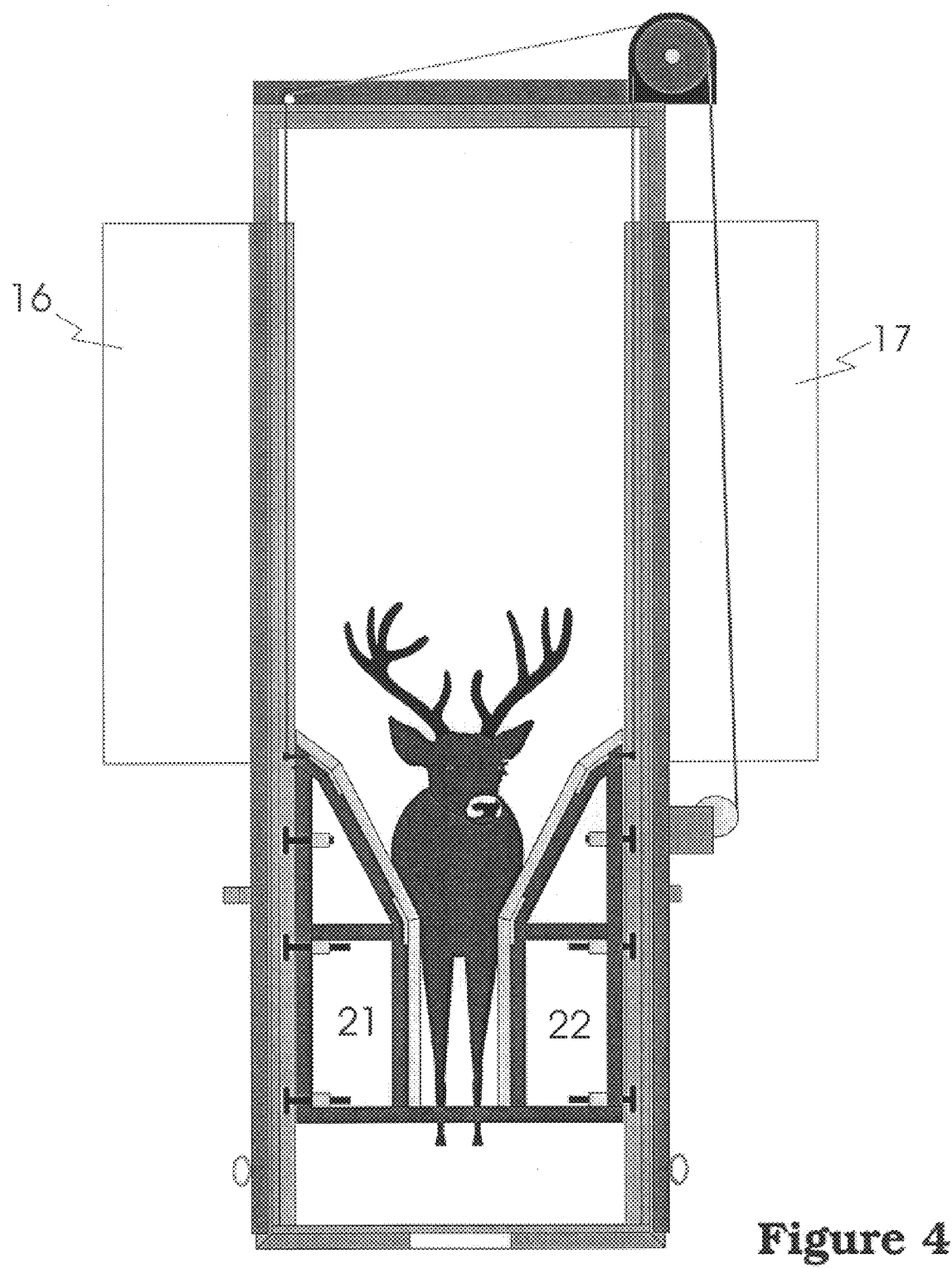
FIG. 4 is an end view of the apparatus showing an animal restrained therein.

Immobilization of the animal is effected through use of a deer lift 20 having vertically movable, opposed, outwardly and upwardly inclined surfaces 21 and 22. The opposed surfaces are spaced from one another with the space therebetween defining a passageway 23 for the animal to pass through the interior of the housing. Each of the opposed surfaces 21 and 22 have an inclined portion 24 and 25 which extends upwardly and outwardly from the passageway, and an innermost lower edge 26 and 27 adjacent to the passageway. Optional, substantially vertical surfaces 28 and 29 may be provided, extending from the lower edges approximately to the floor 15 or ground, to minimize kicking in a sideways direction by the animal. The width of the passageway (i.e., the distance between the edges 26 and 27) may vary with the size of the target animal, but should be great enough to allow the animal to walk through the passageway without its legs pressing against the opposed surfaces 21 and 22 while the surfaces are in a first, lower position (FIG. 1), but small enough such that the opposed surfaces engage the trunk or body of the animal, such as at the animal's lower shoulders and haunches, as the opposed surfaces are elevated to a second, raised position (FIGS. 2 and 4). Without being limited thereto, the space between the opposed surfaces is preferably selected such that the width of the passageway is between about 6 to 36 inches, most preferably between about 6 to 24 inches. For restraining white-tailed deer common throughout the eastern half of the United States, the preferred space between the opposed surfaces is selected such that the width of the passageway is between about 6 to 18 inches.

The height of the opposed surfaces 21 and 22 relative to the floor 15 or ground, including their height at the first, lower position and the second, raised position, are likewise variable with the particular animal being restrained. The height of the lower edges 26 and 27 relative to the floor 15 or ground at the first, lower position is selected to allow the target animal to walk through the passageway unimpeded with its torso or body substantially free of contact with the edges or opposed surfaces 21 and 22. However, the height should not be so low as to only extend up to the lower half of the target animal's legs. Therefore, the preferred height of the edges 26 and 27 at the first, lower position should be within about 6 inches, particularly about 2 to 3 inches, of the bottom of the animal's torso. In contrast, the height of lower edges 26 and 27 at the second, raised position is selected such that the animal's feet are raised free of the floor 15 or ground as the animal's body or torso is lifted and supported by the opposed surfaces 21 and 22. Without being limited thereto, preferred heights of the lower edges 26 and 27 at the first, lower position may therefor vary between about 6 to 24 inches, particularly about 12 to 18 inches, while their preferred heights at said second, raised position may vary between about 12 to 36 inches, particularly about 12 to 18 inches, higher than this first, lower position.

The size of the opposed surfaces 21 and 22, including their length and depth (i.e., from lower edges 26 and 27 to the top of the inclined portions 24 and 25) are not critical will also vary with the target animal. To accommodate animals of varying sizes within the housing, the opposed surfaces preferably extend substantially between the front and rear ends 11 and 12 of the housing. Without being limited thereto, the depth of the inclined portions of the 24 and 25 will typically be greater than or equal to about 6 inches, preferably greater than or equal to about 10 inches, while the length of the opposed surfaces will typically be greater than or equal to about 4 feet, preferably greater than or equal to about 5 feet. The angle or degree of inclination of the inclined portions 24 and 25 of the opposed surfaces is not critical. However, very low angles approaching the horizontal may cause discomfort to the animal when it is raised as all of the animal's weight will be supported at lower edges 26 and 27, and may also allow the animal to climb onto the opposed surfaces 21 and 22. Conversely, very high angles of inclination may unduly limit the range of animal sizes which may be accommodated within the housing. Consequently, preferred angles of inclination include, but are not limited to those between about 20 to 70°, most preferably between about 30 to 60°. In a particularly preferred embodiment shown in the Figures, opposed surfaces 21 and 22 include one or more additional inclined portions 50 and 51 which extend above inclined portions 24 and 25, and have no or a lower angle of inclination. As with the inclined portions 24 and 25, additional inclined portions 50 and 51 preferably have a degree of inclination sufficient to prevent the animal from climbing onto the opposed surfaces. Configuration of the opposed surfaces in this manner provides greater headroom for the restrained animal, which is particularly useful for accommodating antlered animals.

Figure 5:
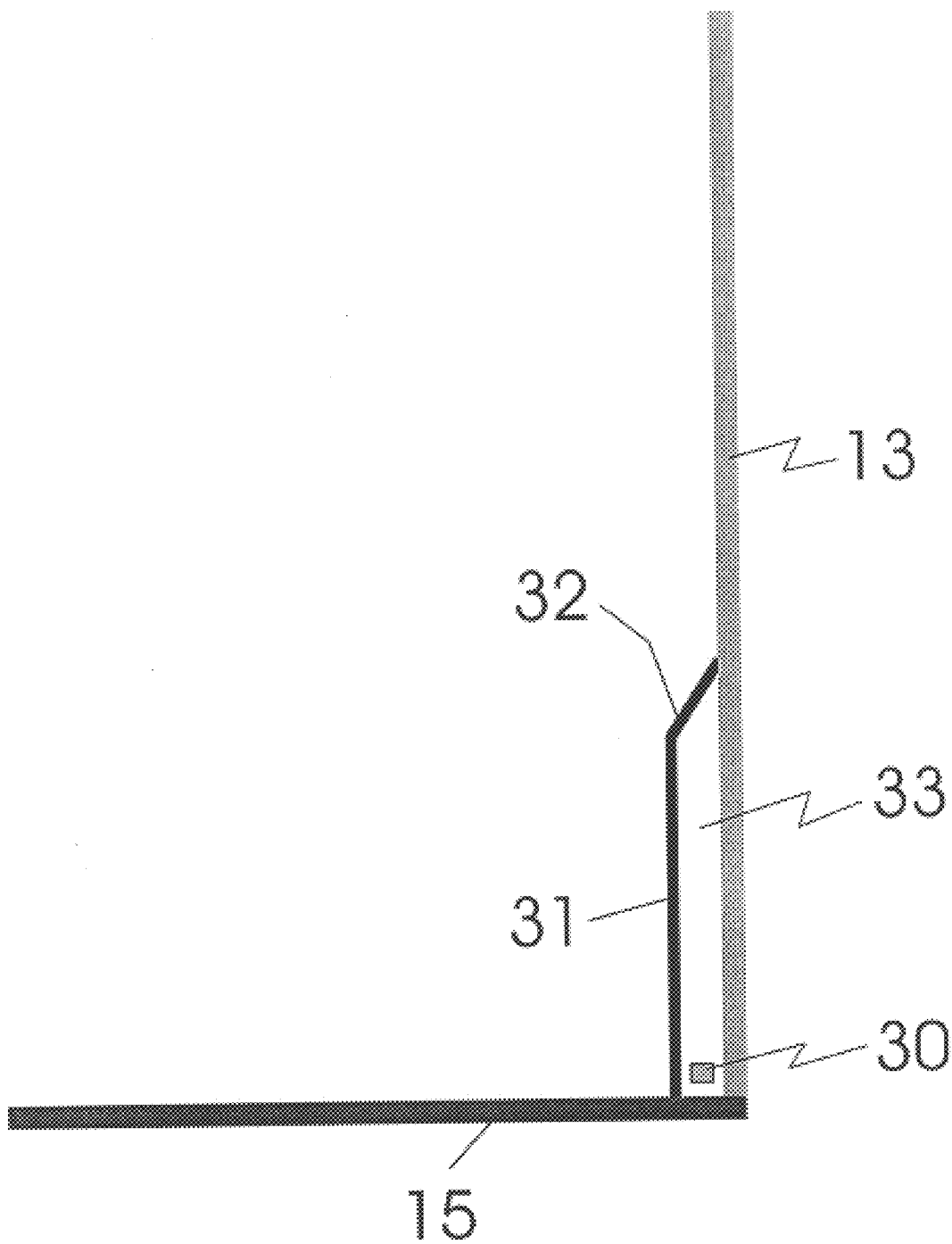
FIG. 5 is an expanded, cross-sectional view of the apparatus of FIG. 1 showing the rear door adapted to accommodate a crossbar connecting the opposed surfaces.

An optional crossbar 30 is preferably provided, connecting the lower ends of the opposed surfaces 21 and 22 to ensure their uniform movement. Moreover, the opposed surfaces may be adjustably attached to this crossbar to allow the width of passageway 23 to be increased or decreased for accommodating animals of different sizes. Adjustable connection in this manner may be effected, for example, by use of conventional pins, bolts, screws, cooperating projections and detents, or clamps. To prevent a trapped animal from catching its hooves on this crossbar, the inner surface of upwardly/downwardly sliding door 13 preferably includes an inwardly projecting substantially vertical surface 31, extending substantially across the width of the passageway (FIG. 5). The vertical surface 31 is connected to the door through an inclined upper portion 32, and is spaced from the door a distance sufficient to form a channel 33 through which crossbar 30 may pass as the opposed surfaces are raised and lowered.

Figure 6:
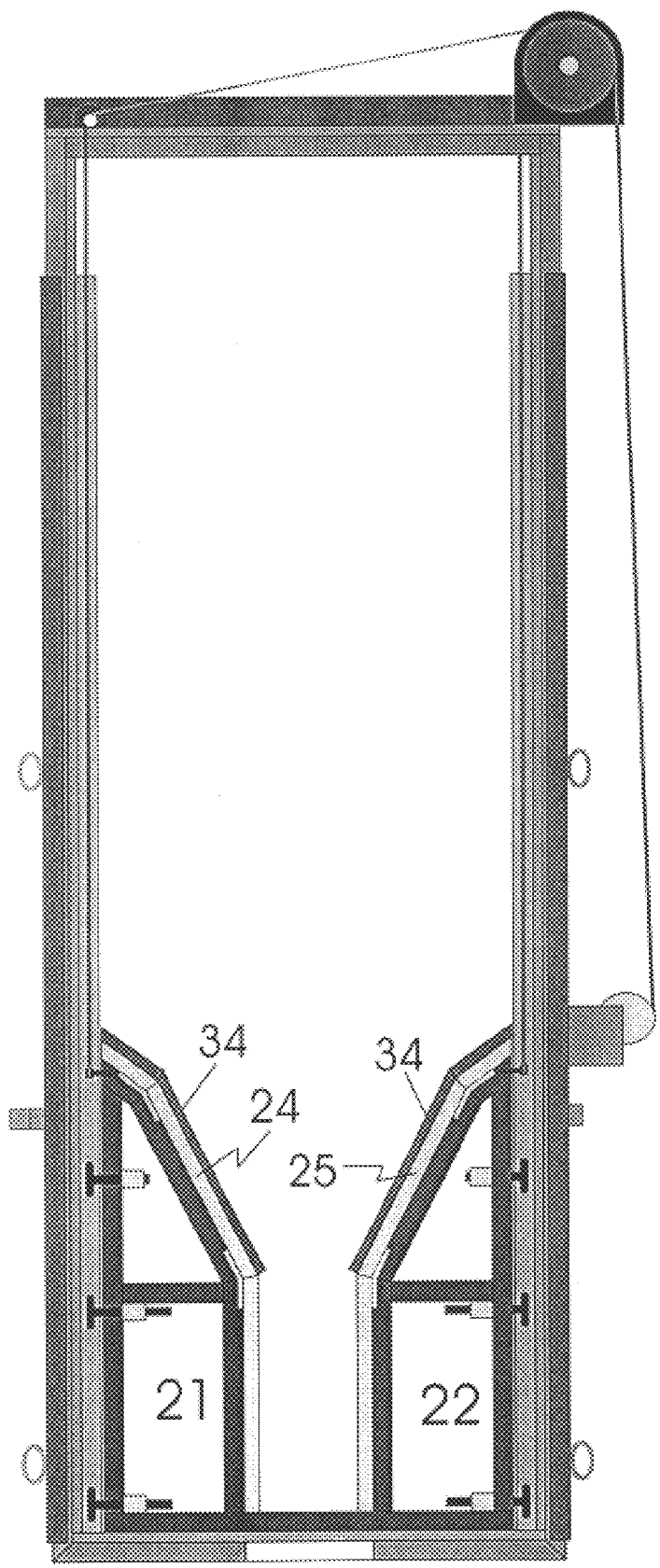
FIG. 6 is a cross-sectional view of the apparatus having panels on the opposed surfaces.

In another preferred embodiment shown in FIG. 6, one or more removable panels 34 may be optionally provided which are securely attach to one or both of the opposed surfaces 21 and 22, particularly onto inclined portions 24 and 25, and/or additional inclined portions 50 and 51, facing the interior of the housing. By providing one or more of these removable panels, the lateral spacing between the opposed surfaces may be quickly and easily adjusted by the handler, allowing animals of significantly smaller sizes to be restrained in the same device. Thus, the effective size and spacing of the opposed surfaces 21 and 22 may be readily selected to accommodate the largest potential target animal. When it is desired to restrain smaller animals, the removable panels 34 are placed on the opposed surfaces until the lateral spacing between the panels is sufficiently small to engage the trunk or body of the animal.

The size of the panels 34 may vary with the target animals, but the panels will preferably be of a size effective to substantially cover the area of inclined portions 24 and 25 of the opposed surfaces. As used herein, "substantially cover" is defined herein as covering at least 50% of the area of the inclined portions, although in the preferred embodiment, the coverage is greater than or equal to about 70%, and most preferably greater than or equal to about 80%. Consequently, in the preferred embodiment, the depth of the panels will be approximately the same as the depth of inclined portions 24 and 25 (extending between lower edges 26 and 27 to the top of the inclined portions). The length of the panels may be somewhat more variable, as the panels may be shorter than the opposed surfaces when restraining smaller animals. However, for greatest flexibility, the panels will substantially extend over the length of the inclined portions 24 and 25 of the opposed surfaces. The thickness of the panels is variable and may be readily selected by the handler. As a practical matter, it is envisioned that panel thickness will vary between about 0.25 to 4 inches. Furthermore, it is also envisioned that two, three or more panels may be stacked on either or both of the opposed surfaces, one upon the other, allowing different lateral distances between the opposed surfaces to be selected as appropriate for a particular target animal. To prevent injury to the target animal, the lower edge of the panels 34 (adjacent to lower edges 26 and 27) are preferably rounded and/or padded. Panels may be attached with screws, pins, or bolts, releasable clips, removable or tacky adhesives, hook and loop closures such as velcro, or heavy tape.

Lifting the target animal off the floor or ground with its weight supported upon the opposed surfaces 21 and 22 is effected by use of a means for raising. In the preferred embodiment, winches are used as the raising means. As shown in the Figures, a winch 40 is mounted onto housing 10, linked to a spool 41 which is fixed to shaft 42, through cable 43. Winch 40 may be driven with a small motor or hand crank, although use of a conventional hand drill is preferred. Shaft 42 further includes one or more additional spools 44 having oppositely wound cables 45 attached to opposed sides 21 and 22. Lifting the opposed surfaces 21 and 22 is effected by turning winch 40, thereby drawing cable 43 downwardly from spool 41, rotating shaft 42. As shaft 42 rotates, cables 35 are drawn upwardly onto spools 34, lifting opposed sides 21 and 22. It is understood that a variety of raising means may be employed, and the particular means selected is not critical. Moreover, such raising means may be motor driven assisted, manually powered, or spring powered or assisted. Without being limited thereto, examples of means for lifting suitable for use herein include: belt drives, chain drives, gear drives, lines and pulleys (including blocks and tackles), springs, pneumatic cylinders, hydraulic cylinders, cooperating gears, ball screws, chains and sprockets, and winches.

Figure 2:
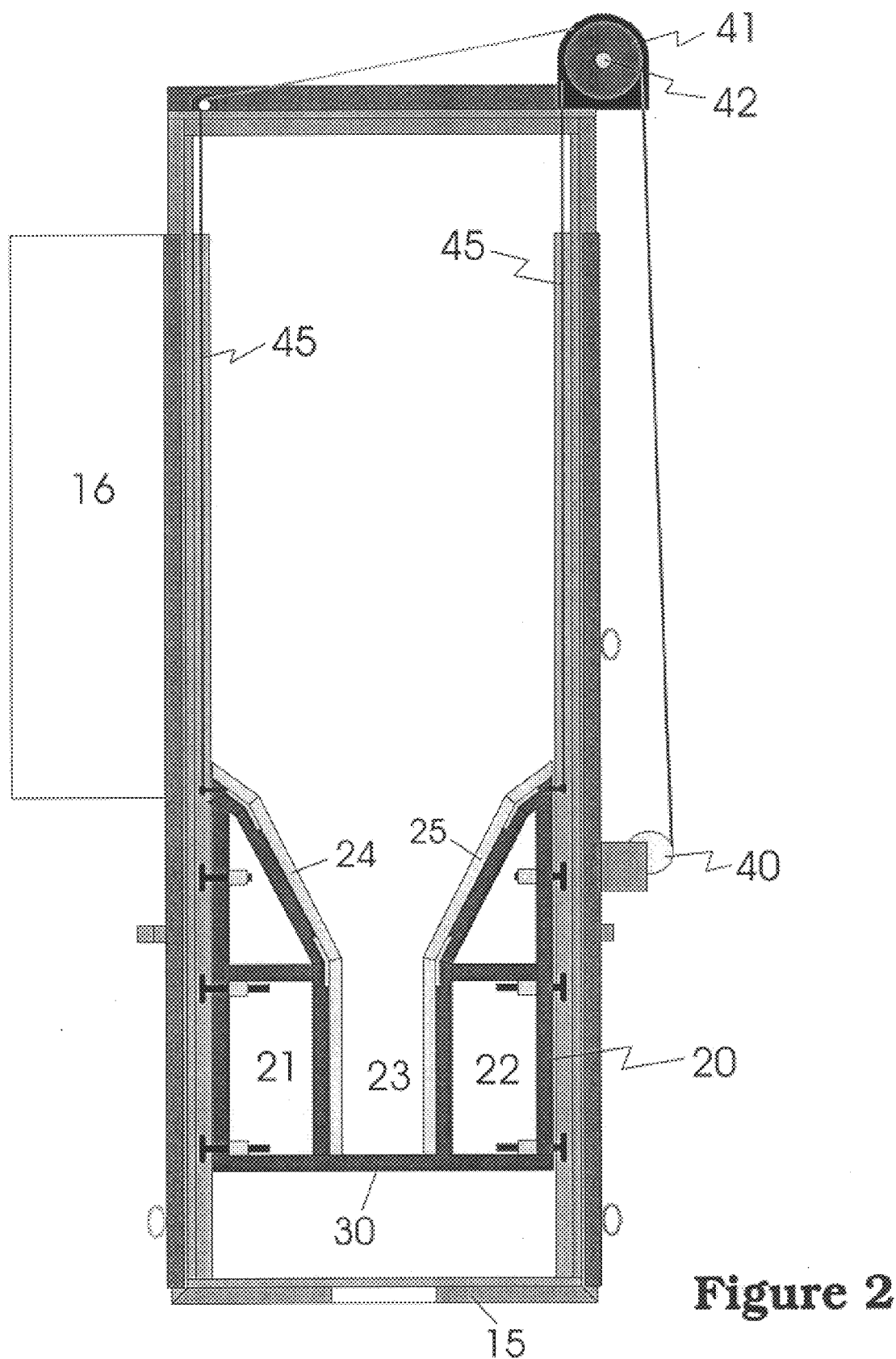
FIG. 2 is a cross-sectional end view of the apparatus with the opposed surfaces in a second, raised position.
Figure 3:
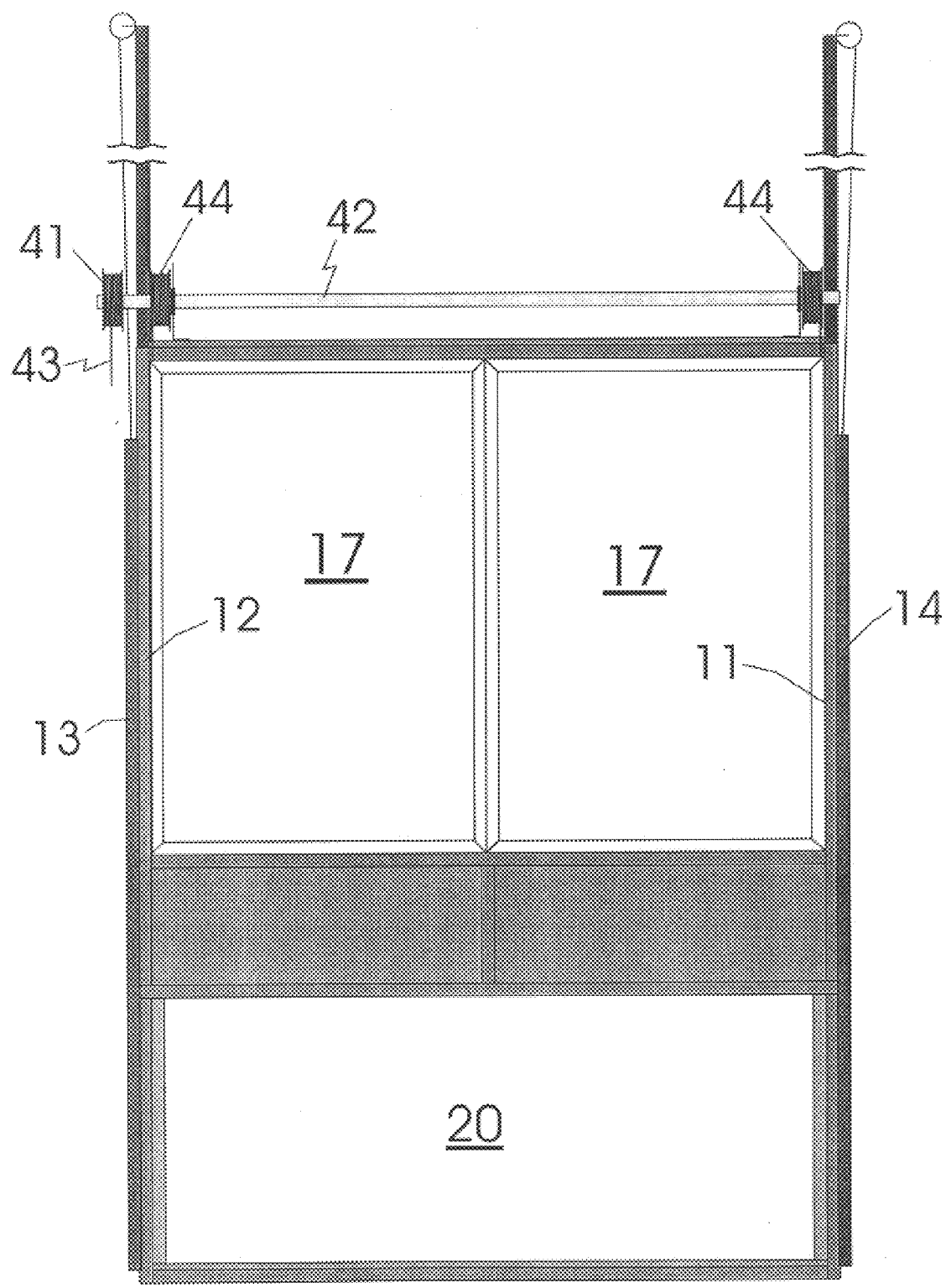
FIG. 3 is a side view of the apparatus of FIG. 1.

In use, doors 13, 16 and 17 are initially closed, and opposed sides 21 and 22 are dropped to the first, lower position shown in FIG. 1. Door 14 is opened, and the target animal, which may have been previously captured in a corral or otherwise confined or controlled, is herded into the housing through front end 11 until it is fully within the housing and standing in the passageway between opposed sides 21 and 22, whereupon door 14 is closed. Winch 40 is actuated, slowly raising the opposed sides into contact with the torso of the animal and gently elevating it off of floor 15 as the opposed sides reach the second, raised position shown in FIGS. 2 and 4. Once the animal is fully suspended, access doors 16 and 17 may be opened to allow the animal to be examined or treated as necessary by the handler. Upon completion of the examination and handling, the access doors 16 and 17 are closed, and the winch 40 operated in the opposite direction, slowly lowering opposed sides to their first position and returning the animal into contact with the floor 15. Door 13, may then be opened, allowing the deer to exit. Because the invention allows the animal to be gently and slowly lifted and lowered, it is subjected to a minimum level of stress and trauma. Moreover, although many wild animals including deer are normally skittish and resist recapture and rehandling, we have surprisingly found that by using the instant invention the animals develop a minimal degree of trap-shyness and suffer minimal bruising and abrasion from the device. The same animal may be repeatedly trapped and herded through the device and handled with a minimum of resistance.

It is understood that the foregoing detailed description is given merely by way of illustration and that modifications and variations may be made therein without departing from the spirit and scope of the invention.

We claim:

1. An apparatus for restraining wildlife for examination or handling comprising:

(a) a housing having open front and rear ends allowing the entry and exit of a target animal, said rear end having a first openable/closable door effective for controlling egress of said target animal from the interior of said housing;

(b) a deer lift disposed within the interior of said housing, said deer lift comprising vertically movable opposed surfaces, each of said opposed surfaces comprising an outwardly and upwardly inclined portion having an innermost lower edge, and each of said opposed surfaces being movable between a first, lower position and a second, raised position, wherein said opposed surfaces are spaced from one another defining a passageway therebetween having a width effective for allowing said target animal to walk therethrough when said opposed surfaces are in said lower position while being sufficiently close such that said opposed surfaces engage the trunk of said target animal when they are elevated to said raised position, and further wherein each of said opposed surfaces comprise a substantially vertical surface extending downwardly from said lower edge effective to minimize kicking in a sideways direction by said target animal; and (c) means for raising said opposed surfaces between said first, lower position and said second, raised position, wherein said raising consists essentially of movement in a vertical direction;

wherein a target animal which has entered said housing through said open end and moved between said opposed surfaces is lifted by raising said opposed surfaces to engage and elevate said trunk of said animal with its legs suspended, thereby allowing examination and/or handling thereof, said animal being allowed to egress from said rear end of said housing by lowering of said opposed surfaces and opening said openable/closable door.

2. The apparatus of claim 1 wherein said front end further comprises a second openable/closable door.

3. The apparatus of claim 1 wherein said opposed surfaces extend substantially between said front end and said rear end.

4. The apparatus of claim 1 wherein said housing further comprises opposed side walls, at least one of said side walls being openable and closable to provide access to said interior and a target animal disposed therein.

5. The apparatus of claim 1 wherein the height of said lower edge at said first, lower position is between about 6 to 24 inches.

6. The apparatus of claim 5 wherein the height of said lower edge at said second, raised position is between about 12 to 36 inches higher than said first, lower position.

7. The apparatus of claim 5 wherein the distance between said lower edges of said opposed surfaces is between about 6 to 18 inches.

8. The apparatus of claim 1 wherein said housing further comprises a stationary floor.

9. The apparatus of claim 1 wherein said means for raising said opposed surfaces is selected from the group consisting of belt drives, chain drives, gear drives, lines and pulleys, springs, pneumatic cylinders, hydraulic cylinders, cooperating gears, ball screws, chains and sprockets, and winches.

10. The apparatus of claim 9 wherein said means for raising are motor assisted or powered, or manually powered, or spring powered or assisted.

11. The apparatus of claim 1 wherein each of said opposed surfaces comprise said inclined portion extending upwardly and outwardly from said passageway and having an innermost lower edge adjacent to said passageway, said apparatus further comprising one or more removable panels removably attached to one or both of said inclined portions facing the interior of said housing, wherein said panels are of a size effective to substantially cover the area of said inclined portions.

12. The apparatus of claim 11 wherein said panels extend approximately between said lower edge of said inclined portions and the top of said inclined portions.

13. The apparatus of claim 11 the thickness of said panels is between about 0.25 to 4 inches.

14. The apparatus of claim 11 comprising two or more of said panels stacked on either or both of said inclined portions.

15. The apparatus of claim 1 further comprising a crossbar adjacent to and connecting the lower ends of said vertically movable opposed surfaces, said crossbar being adjustably attached to said vertically movable opposed surfaces effective to allow said width of said passageway to be increased or decreased.

16. The apparatus of claim 1 wherein each of said opposed surfaces are raised uniformly between said first, lower position and said second, raised position.

17. An apparatus for restraining wildlife for examination or handling comprising:

(a) a housing having open front and rear ends allowing the entry and exit of a target animal, said rear end having a first openable/closable door effective for controlling egress of said target animal from the interior of said housing;

(b) a deer lift disposed within the interior of said housing, said deer lift comprising vertically movable opposed surfaces, each of said opposed surfaces having an outwardly and upwardly inclined portion and being movable between a first, lower position and a second, raised position, wherein said opposed surfaces are spaced from one another defining a passageway therebetween having a width effective for allowing said target animal to walk therethrough when said opposed surfaces are in said lower position while being sufficiently close such that said opposed surfaces engage the trunk of said target animal when they are elevated to said raised position;

(c) means for raising said opposed surfaces between said first, lower position and said second, raised position, wherein said raising consists essentially of movement in a vertical direction; and (d) a crossbar adjacent to and connecting the lower ends of said vertically movable opposed surfaces, said crossbar being adjustably attached to said vertically movable opposed surfaces effective to allow said width of said passageway to be increased or decreased;

wherein a target animal which has entered said housing through said open end and moved between said opposed surfaces is lifted by raising said opposed surfaces to engage and elevate said trunk of said animal with its legs suspended, thereby allowing examination and/or handling thereof, said animal being allowed to egress from said rear end of said housing by lowering of said opposed surfaces and opening said openable/closable door.

18. The apparatus of claim 17 wherein said crossbar is adjustably attached to said vertically movable opposed surfaces by a pin, bolt, screw, cooperating projection and detent, or clamp.

* * * * *